United States Patent [19]

Herre et al.

[11] Patent Number: 5,703,999
[45] Date of Patent: Dec. 30, 1997

[54] PROCESS FOR REDUCING DATA IN THE TRANSMISSION AND/OR STORAGE OF DIGITAL SIGNALS FROM SEVERAL INTERDEPENDENT CHANNELS

[75] Inventors: Jurgen Herre, Buckenhof; Dieter Seitzer; Karl-Heinz Brandenburg, both of Erlangen; Ernst Eberlein, Grossenseebach, all of Germany

[73] Assignee: Fraunhofer-Gesellschaft zur Foerderung der angewandten Forschung e.V., Germany

[21] Appl. No.: 751,456

[22] Filed: Nov. 18, 1996

Related U.S. Application Data

[63] Continuation of Ser. No. 338,618, filed as PCT/DE93/00448 May 18, 1993.

[30] Foreign Application Priority Data

May 25, 1992 [DE] Germany ............... 42 17 276.4

[51] Int. Cl.$^6$ ............................................. G10L 3/00
[52] U.S. Cl. ..................... 395/2.12; 395/2.14; 395/2.1; 395/2.92; 381/1; 381/2
[58] Field of Search ..................... 395/2.1, 2.12, 395/2.14, 2.2, 2.15, 2.16, 2.18; 381/1, 2

[56] References Cited

U.S. PATENT DOCUMENTS

| 4,942,607 | 7/1990 | Schroder et al. | 381/31 |
| 5,014,318 | 5/1991 | Schott et al. | 381/47 |
| 5,285,498 | 2/1994 | Johnston | 381/2 |

OTHER PUBLICATIONS

"Perceptual Transform Coding of Wideband Stereo Signals", James D. Johnston, ICASSP-89, vol. 3, 1989, pp. 1993–1996.

"Transform Coding of Audio Signals Using Perceptual Noise Criteria," James D. Johnston, IEEE Journal on Selected Areas in Communications, vol. 6, No. 2, Feb. 1988, pp. 314–323.

*Primary Examiner*—Allen R. MacDonald
*Assistant Examiner*—Vijay B. Chawan
*Attorney, Agent, or Firm*—Evenson, McKeown, Edwards & Lenahan, P.L.L.C.

[57] ABSTRACT

A process for reducing data in the transmission and/or storage of digital signals of several interdependent channels is described.

As the signals from the channels are not independent of one another, an additional data quantity reduction is possible during transmission.

In known processes for the coding of signals from two stereo channels, in the case of an unfavorable signal composition interference can be caused by the coding process and cannot be concealed by the signal actually present in the channel and consequently reduce listening enjoyment.

In the process according to the invention and with the aid of the spectral values of corresponding blocks of several channels, there is a balancing of the necessary data rate for a separate coding of the two channels and for a joint coding. There is a joint coding of the channels for as long as the data rate for the joint coding does not exceed by a predeterminable value the data rate for the separate coding of the particular channel. In this case the spectral values of the corresponding blocks are similar, so that a joint coding is preferred.

In the case of highly dissimilar signals the balancing leads to a separate transmission of the signals. In order to ensure that there is no interference, temporarily no use is made of the joint coding of several channels.

13 Claims, 1 Drawing Sheet

PROCESS FOR REDUCING DATA IN THE TRANSMISSION AND/OR STORAGE OF DIGITAL SIGNALS FROM SEVERAL INTERDEPENDENT CHANNELS

This application is a continuation of application Ser. No. 08/338,618, filed as PCT/DE93/00448 May 18, 1993.

BACKGROUND AND SUMMARY OF THE INVENTION

The invention relates to a process for data compression in the transmission and/or storage of digital signals in multiple interdependent channels.

Processes for transmitting frequency coded audio signals are known, for example, from PCT Publications WO 88/01811 and WO 89/08357, and reference is made to these documents for the explanation of terms not explained here.

The standardization committee Moving Pictures Experts Group (MPEG) of the International Standardization Organization (ISO) has established ISO standard 11172-3 for the bit stream of the signal to be transmitted, and for the design of the coder.

In numerous known processes for data-reduced coding of digital audio signals, the signals are coded in the frequency domain. The signals are transformed from the time domain into the frequency domain (in spectral values) by means of a suitable mapping method, such as Fast Fourier Transform, DCT, MDCT, a polyphase filter bank or a hybrid filter bank. These processes permit extensive use of signal redundancy and irrelevance with respect to the properties of the human ear. If the signals of the several channels are not independent of one another, an additional reduction of the transmitted data is possible. The prerequisite of channel interdependence is fulfilled, for example, in the case of signals in the channels of a quadrophonic or stereophonic audio signal.

Recently, further work has been carried out on the development of the international standard for the transmission of data in several channels. The publication "MUSICAM-Surround: A Universal Multi-channel Coding System Compatible with ISO 11172-3", 93rd AES Convention, 1992, San Francisco, proposes a process for the transmission of up to five channels (for example, two stereo channels and in addition a middle channel and two surround channels (3/2 stereophony) or two stereo channels and three commentary channels). In this process the signals in the individual channels are also interdependent.

A process for the utilization of redundancy/irrelevance between the two channels of a stereo audio signal is described in the publication by J. D. Johnston, "Perceptual Transform Coding of Wideband Stereo Signals, ICASSP 89. In this so-called M/S coding (middle/side coding), the sum (=middle) and the difference (=side) of the stereo signal are coded in place of the left and right channel, which leads to a saving in the quantity of data to be transmitted.

The dependence of the signals of two stereo channels is also utilized in the intensity stereo process discussed in "Subband Coding of Stereophonic Digital Audio Signals", Proc. of the ICASSP, 1991, pp 3601 to 3604. In this process the mono signal and additional information on the left/right distribution of the signal are transmitted.

In both of these processes, however, considerable interference can occur in the case of an unfavorable signal composition. That is, for example, a widely differing signal composition in the left and right channel leads to defects in M/S coding, which cannot be concealed by the signal present in the channel. Thus, e.g. a loud saxophone signal which is contained almost exclusively in the right channel, causes interference on the left channel, which is not concealed and can be heard clearly. Similarly, in the intensity stereo process the three-dimensional sound impression is disturbed if the left and right channels have widely differing spectral compositions.

Thus, the known processes are usable only if unfavorable signal compositions are not to be expected, or if it is possible to accept interference or noise in order to achieve a reduction of the data quantity. In addition, the known processes are restricted to stereo coding.

The object of the invention is to provide a process for compression or reduction of data in the transmission and/or storage of digital signals in multiple interdependent channels, by utilizing the interdependence of the signals in the different channels.

Another object of the invention is to provide such a method of data compression which does not lead to subjectively perceptible interference between the transmitted signals.

These and other objects and advantages are achieved according to the invention, in which the signals of the different channels are initially transformed into spectral data blocks or bands. Then, based on the spectral values of corresponding data blocks of the several channels, there is a balancing or comparison of the data rates necessary for a separate coding of the channels, i.e. for a mono coding of the channels and for a joint coding of several channels. A joint coding of the particular channel takes place as long as the data rate for the joint coding does not exceed the data rate for the separate coding of the channels, by more than a predetermined threshold value. In this case the spectral values of the corresponding data blocks are similar, so that a joint coding is preferred.

If the data rate for joint coding exceeds the data rate for the mono coding by a predetermined value, mono coding of the channels is utilized. In this case the spectral value of the corresponding data blocks of the channels are so dissimilar that a very high data rate would be required in order not to produce defects in the corresponding channels due to the coding process; therefore such defects cannot be concealed by the signal actually present in these channels. With a view to reliably avoiding such disturbing defects, in the process according to the invention, joint coding is temporarily discontinued.

For the comparison of the data rates necessary for the mono coding and/or the joint coding, an estimator SF is formed, which indicates the bit number with which each sample must be coded in order to keep the interference caused by the coding process below the predetermined masking threshold.

In coding processes providing a fixed bit allocation for the individual frequency bands, the estimator can be calculated beforehand (cf. e.g. Theile G., Stoll G. Link M. Low bit-rate coding of high quality audio signals, in EBU Review No. 230, 1988, pp 158–181).

With coding processes having a variable bit number, such as is described in PCT Publication WO 88/001811, the estimator (SF) is to be chosen appropriately for the corresponding process. A preferred estimator is given hereinafter.

Thus, in the process according to the invention, the SF of the possible coding processes, namely mono coding and joint coding of several channels, undergo blockwise comparison. On the basis of the comparison a decision is made as to whether mono coding or joint coding of several channels will be carried out on the signal. When comparing the estimators of mono coding and/or joint coding, the necessary data rate for the separate coding of the signals is obtained by adding the estimators of the individual channels.

In the case of stereo coding of two channels e.g. the estimator SF (LR) for the separate coding is formed by the addition of estimators SF (L) and SF (R) of the signals from the left (L) and the right (R) channels.

In another embodiment of the process the joint coding of the channels takes place through the formation of linear combinations (matrixing) of the input signals. Following the decoding of the signal the matrixing is cancelled out again (dematrixing). When transmitting two stereo channels the coding takes place with the aid of middle/side (M/S) stereo coding. In this coding in place of the left and right channel, the sum (=middle) and the difference (=side) of the signals from the left and right channels are coded, which leads to a saving on the data quantity to be transmitted.

According to another embodiment of the invention the estimator SF (Mijk) of the necessary data rate for the joint coding of signals from channels Ki, Kj, Kk, etc. is formed by the addition of the estimators SF (Mi), SF (Mj), SF (Mk), Mi being the ith matrix channel.

When coding two stereo channels the estimator of the necessary data rate for the joint coding of the signals is obtained by the summation of the SF of the middle signal (M) and the side signal (S). The middle signal is formed from the signal (L) of the left and the signal (R) of the right channels through the relationship $$M = \frac{L+R}{\sqrt{2}}$$

the side channel (S) by the relationship $$S = \frac{L-R}{\sqrt{2}}.$$

In still another embodiment of the invention prior to the comparison of the necessary data rate, the necessary precision of the coding is established and for this purpose a maximum permitted interference is predetermined. In no channel must the interference which occurs exceed this permitted interference. For the coding of two stereo channels, as a function of the particular signal for both channels, that masking threshold is calculated from the acoustic model which guarantees the latter condition. From the two calculated masking thresholds use is made of the minimum threshold for the coding of both channels. This process ensures that the permitted interference or noise signal is never exceeded.

In a further advantageous embodiment of the invention, the so-called Perceptual Entropy (PE) is used for the estimator. The PE of an audio signal is the minimum data rate which is required with predetermined codings in order to be able to code and decode the audio signal without a subjectively perceptible change. The determination of the PE is e.g. described in J. D. Johnston, Estimation of Perceptual Entropy, Using Noise Masking Criteria, ICASSP 1988, pp 2524–2527.

According to another feature of the invention, the comparison of the necessary data rate is based on the relationship SF (Mijk . . . )<$C_1$ SF (Ki, Kj, Kk . . . )+$C_2$, in which $C_1$ and $C_2$ are predeterminable constants. If the spectral values from the corresponding data blocks of the particular channels fulfil the indicated relationship, joint coding takes place. In the case of stereo coding of two channels the relationship is: SF (MS)<$C_1$ SF (LR)+$C_2$.

The smaller the constants $C_1$ and $C_2$, the more similar the spectral values of the signals from the channels must be in order to fulfill the conditions for joint coding. There is a corresponding increase in the probability that an interference signal produced by another channel during coding is concealed by the signal actually present in the channel. Preferred values for the constants $C_1$ and $C_2$ are given as follows:

$$1 \leq C_1 \leq 2$$

$$C_2 = 0.$$

The essential advantages of the invention are that, without any noteworthy increase in the complexity of the transmission process, an additional data reduction is obtained. Also, there is a reliable avoidance of defects which can be caused by a joint coding of several channels in each case different channels. The process according to the invention is independent of the specific construction of the coding process used, and is therefore universally usable. The process merely requires an additional signal processing in the coder required in small numbers on the transmitter side, but not in the decoder used in large numbers by final consumers.

Other objects, advantages and novel features of the present invention will become apparent from the following detailed description of the invention when considered in conjunction with the accompanying drawings.

BRIEF DESCRIPTION OF THE DRAWING

The single FIGURE of the drawing is a function diagram of the method according to the invention in which the coding of two stereo channels is used as an example.

DETAILED DESCRIPTION OF THE DRAWING

Figure 1:
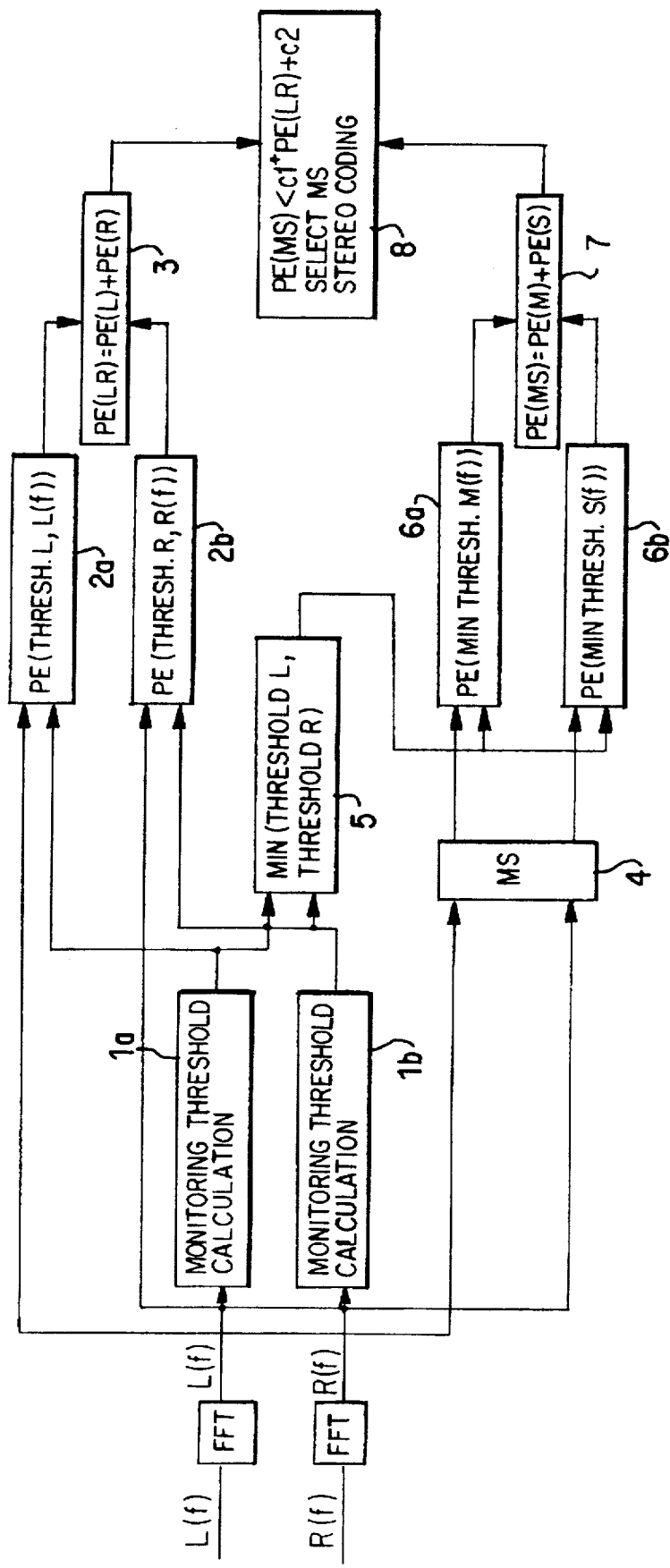

The samples L (t) and R (t) of stereo signals from the left and right channel of a stereo source are transformed by means of a fast Fourier transformation (FFT) blockwise from the time domain into the frequency domain in spectral values L (f), R (f); and from the latter the masking thresholds (1a, 1b) for both channels are calculated.

Then, for comparing the necessary data rates estimators are determined for separate coding on the one hand, and for joint coding on the other. In the represented, preferred embodiment perceptual entropy (PE) is used as the estimator.

For determining the PE (LR) for separate coding, the PE's are determined separately (2a, 2b) for the left and right channels, using the calculated masking threshold. The total PE (LR) is obtained by summation: PE (LR)=PE (L)+PE (R) (3).

For the determination of the PE (MS) of the joint coding of the two channels, the spectral values undergo, in the preferred embodiment, a middle/side matrixing (4). For this purpose the middle signal is formed by the relationship:

$$M = \frac{L+R}{\sqrt{2}}$$

and the side signal (S) by the relationship $$S = \frac{L-R}{\sqrt{2}} \quad (4).$$

The following determination of the PE's of the signals is based on the minimum size from the calculation of the masking thresholds of the two channels (1a, 1b).

With the aid of this minimum masking threshold the PE's of the middle signal and side signal are separately determined (6a, 6b), and the joint PE (MS) for the stereo coding is obtained by summation: PE (MS)=PE (M)+PE (S) (7).

Finally, the comparison of the necessary data rate (8) takes place. The audio signals undergo stereo coding if the condition PE (MS)<$C_1$ PE (LR)+$C_2$ is fulfilled. If the condition is not fulfilled, stereo coding does not take place, so as to avoid disturbing defects as a result of coding.

It will be appreciated that the application of the described embodiment is not limited to a specific coding process. In fact, this process according to the invention is universally usable independently of the particular coding process. Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for reducing data for transmission or storage of digital audio signals from several interdependent channels, in which blocks of samples of signals in the respective channels are transformed from time domain into a frequency domain representation, whereby a value is determined for each of a plurality of frequency components in each channel, and the values determined for the respective frequency components are coded, taking account a masking threshold determined by means of a psychoacoustic model, said process comprising the steps of:

determining a first data rate necessary for separate coding of signals in each of the respective channels, said first data rate being determined collectively for all frequency components of signals in said respective channels;

determining a second data rate necessary for joint coding of said signals in the respective channels, said second data rate being determined collectively for all frequency components of signals in said respective channels;

comparing said first and second data rates;

performing joint coding of said signals for all frequency components of the respective channels so long as the data rate necessary for joint coding of said signals does not exceed the data rate necessary for separate coding by a predetermined threshold value; and performing separate coding of said signals for all frequency components of the respective channels, when the data rate necessary for joint coding of said signals exceeds the data rate necessary for separate coding by at least said predetermined value.

2. Process according to claim 1 wherein for the comparison of the data rates necessary for separate and joint coding, an estimator is formed, which indicates a number of bits required to code each frequency component, whereby for a predetermined coding process the interference caused by the latter are kept below the masking threshold.

3. Process according to claim 2 wherein an estimator SF (Ki, Kj, Kk . . . ) of the necessary data rate for separate coding of signals in the respective channels is formed by addition of estimators SF (Ki), SF (Kj) . . . for signals from the respective channels Ki, Kj.

4. Process according to claim 3 wherein joint coding takes place by formation of linear combinations of input signals.

5. Process according to claim 2 wherein an estimator SF (Mijk . . . ) of the necessary data rates for the joint coding of signals from channels Ki, Kj, Kk . . . is formed by addition of estimators SF (Mi), SF (Mj), SF (Mk) . . . , in which Mi is the ith matrixed channel.

6. Process according to claim 5 wherein signals of several channels Ki, Kj, Kk . . . are jointly coded if the following condition is fulfilled, SF (Mijk . . . )<$C_1$ SF (Ki, Kj, Kk . . . )+$C_2$, in which $C_1$ and $C_2$ are predeterminable constants.

7. Process according to claim 6 wherein the constant $C_1$ has a value between 1 and 2.

8. Process according to claim 6 wherein the constant $C_2$ is zero.

9. Process according to claim 2 wherein perceptual entropy of the audio signal is used as the estimator.

10. Process according to claim 1 wherein a permitted maximum interference for the decoded signal in the channels is predetermined, the particular masking threshold for said maximum interference in the channels being calculated and used for determination of the estimator for the joint coding.

11. Process according to claim 1 wherein said step of determining a first data rate comprises:

determining an estimated data rate for each respective channel, for separate coding of all frequency components therein; and adding said estimated data rates to form said first data rate.

12. Process according to claim 1 wherein said step of determining a second data rate comprises:

combining said signals of said respective channels to form a plurality of combined signals based thereon;

determining an estimated data rate for each respective combined signal for coding of all frequency components therein; and adding said estimated data rates to form said second data rate.

13. Process according to claim 12 wherein said combined signals comprise at least a middle and a side signal.

* * * * *